E. W. MILLER.
MINIATURE FENCE.
APPLICATION FILED AUG. 1, 1919.
1,331,117.
Patented Feb. 17, 1920.
2 SHEETS—SHEET 1.
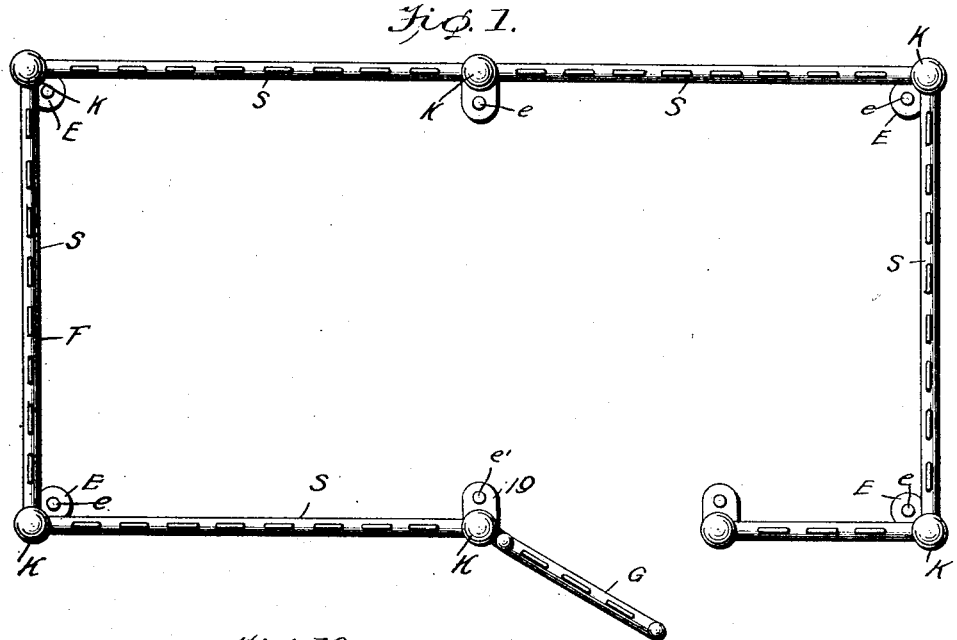
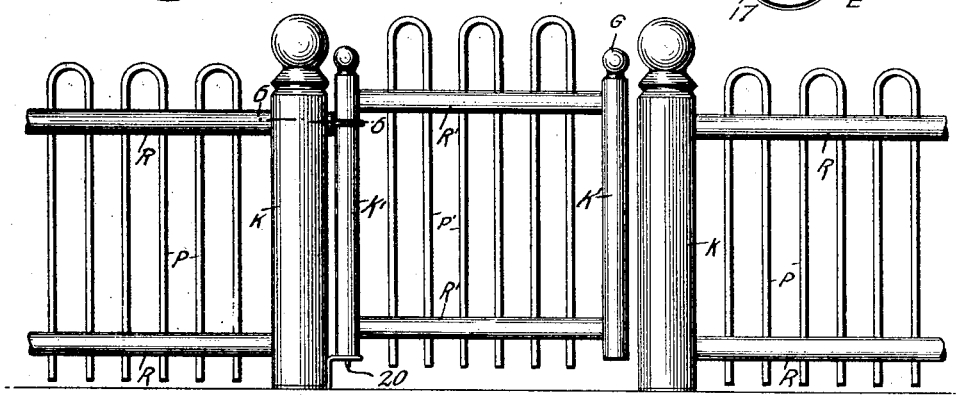
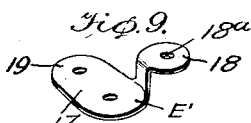
WITNESSES
INVENTOR
E. W. Miller,
BY
ATTORNEYS E. W. MILLER.
MINIATURE FENCE.
APPLICATION FILED AUG. 1, 1919.
1,331,117.
Patented Feb. 17, 1920.
2 SHEETS—SHEET 2.
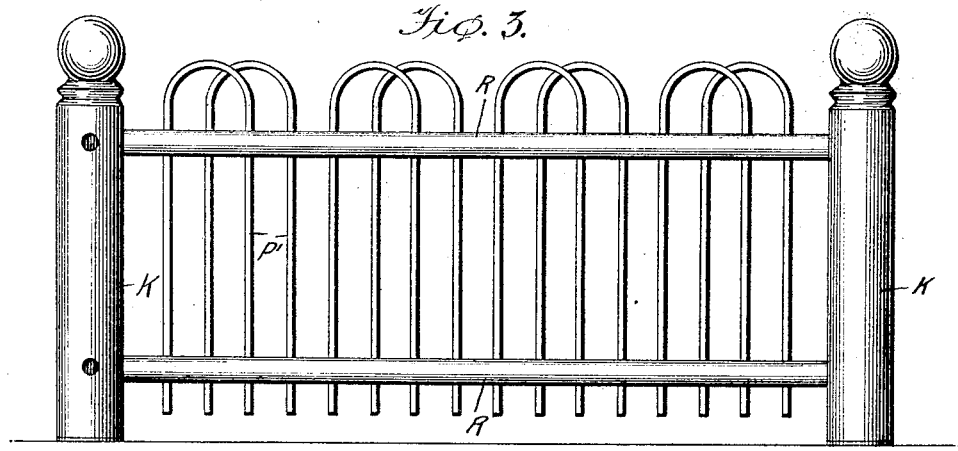
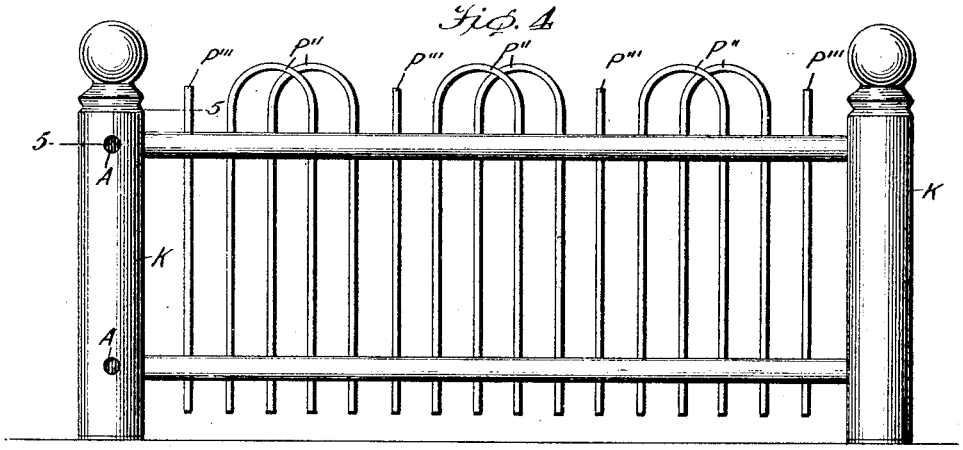
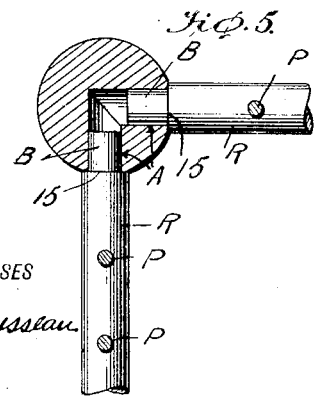
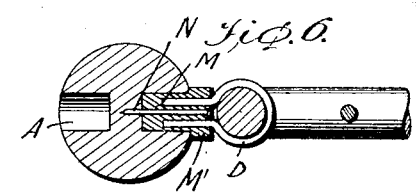
WITNESSES
R. E. Rousseau
INVENTOR
E. W. Miller,
BY
ATTORNEYS

UNITED STATES PATENT OFFICE.

ELLSWORTH W. MILLER, OF HAZLETON, PENNSYLVANIA.

MINIATURE FENCE.

1,331,117.  Specification of Letters Patent.  Patented Feb. 17, 1920.

Application filed August 1, 1919. Serial No. 314,635.

*To all whom it may concern:*

Be it known that I, ELLSWORTH W. MILLER, a citizen of the United States, and a resident of Hazleton, in the county of Luzerne and State of Pennsylvania, have made certain new and useful Improvements in Miniature Fences, of which the following is a specification.

My present invention relates to fences, gates and the like, and particularly to miniature fences which are used for toys or ornamental purposes.

An object of my invention is the provision of a fence formed of sections of extremely simple construction which are interchangeable to permit various arrangements of the several sections to produce inclosures of different configurations.

I will describe three forms of fences and one form of gate, each embodying my invention, and will then point out the novel features thereof in claims.

In the accompanying drawings:—

Figure 1 is a view showing in top plan, one form of fence embodying my invention.

Fig. 2 is a fragmentary view showing in side elevation the fence shown in Fig. 1.

Figs. 3 and 4 are views showing a side elevation, modified forms of pales embodying my invention.

Fig. 5 is a sectional view taken on line 5—5 of Fig. 4.

Fig. 6 is a sectional view taken on line 6—6 of Fig. 2.

Figs. 7, 8 and 9 and 10 are detail views of various parts of my invention.

Similar reference characters refer to similar parts in each of the similar views.

Referring specifically to the drawings and particularly to Figs. 1 and 2, F designates generally a fence comprising a plurality of fence sections S of various lengths which are interchangeable to allow the formation of inclosures of various configurations. As shown in Fig. 1, the sections S are arranged in the form of a rectangle, with a gap therein which is closed by gate G. Each section S comprises a pair of rails R secured in spaced relation by means of pales P. Adjacent sections S are rigidly connected to each other by posts K which are formed with sockets A to snugly receive heads B formed on the ends of the rails R. The rails R are of circular formation in cross section with the heads B formed by reducing the diameter of the rail at the end portions so as to provide a shoulder 15 at the junction of each rail and head to limit the movement of the latter into the sockets. In Fig. 8, I have shown the rail R rectangular in cross section, it being understood that a rail of any suitable contour can be employed within the scope of my invention.

As shown in Fig. 1, the posts K are of circular formation and have their lower ends provided with brackets E of the construction shown in Fig. 10, such brackets having one portion thereof secured to the posts K and the other portion secured to the floor whereby the posts are rigidly held in vertical position. e designates the fastening members for securing the brackets E to the floor, it being understood that the posts K are first secured to the floor by these fastening members and the fence sections S subsequently connected to the posts.

As all of the fence sections S are identical in construction, and the posts K all formed with the sockets A to receive any of the heads B, it is obvious that such sections are readily interchangeable to form fences of various lengths and configurations. As the result of this interchangeability, the fence attains a great value as a toy, because the fence sections can be made of various lengths to allow children to assemble various combinations of the sections in forming inclosures of different configurations. The invention is also highly useful in forming miniature scenes such as used in display windows.

The fence rails R of each section S may be connected by various forms of pales P. In Fig. 2, they are connected at intervals by pales P' each of which comprises a single length of suitable material such as reed, bent in the form of a U and inverted and inserted in suitable openings formed in the rails so that they span the two rails and project above the upper rail and below the lower rail.

In Fig. 3, I have shown pales P' for connecting the rails R, each pale being constructed identical to the pales P' except that they are relatively larger, and the parallel portions spaced farther apart. In this form of my invention, the pales P' are arranged in pairs, with the pales of each pair disposed in overlapped relation to each other in such manner that the inner parallel portions of each pair are spaced apart the same distance as the parallel portions of any two adjacent pairs. Such an arrangement effects the uniform spacing of all of the pales, presenting a fence of substantial construction and symmetrical lines.

In Fig. 4, I have shown another form and arrangement of pales which are the same as in Fig. 3 except each pair of pales P' are spaced farther apart and have interposed therebetween pales P''' each of which comprises a single length of reed.

Referring again to Fig. 1, the gate G comprises rails R' connected at their ends by posts K' in a manner identical to the head and socket connections of the rails R in the posts K. The rails R' are connected between their ends by pales P', the latter being of the same construction as the pales for the section S. As shown in Fig. 2, the gate G is hingedly mounted upon one of the sections S by means of a split resilient ring D and a bracket E' fixed to the lower end of the post K. As shown in Fig. 6, the curved portion of the ring D embraces the adjacent post K', with its opposite ends contracted to restrict the curved portion of the ring, and embedded within a plug M. The plug M is in turn snugly fitted within a socket A formed in the post K and is provided with a head M' for limiting its movement inwardly within the socket. To permanently secure the plug M within the socket A, a nail N or suitable fastening member is driven through the plug and into the post P, as clearly shown in Fig. 6.

In Fig. 9, the detail construction of the bracket E' is shown as comprising a horizontal portion 17 having an L-shaped extension 18 and an extension 19. The extension 19 is secured to the floor by a fastening member $e'$, while the horizontal portion 17 is secured to the bottom end of the post 18. The extension 18 is formed with an opening 18ª which receives a stub shaft 20 formed on the lower end of the post K' so that the shaft co-acts with the ring D to hingedly support the gate, as will be understood.

From the foregoing arrangement, it will be seen that the gate S is readily removable from the adjacent post K, to permit the application thereof to any post in forming inclosures of various configurations.

Although, I have herein described only one form of fence and gate, and various forms of pales, it is to be understood that various changes and modifications may be made without departing from the spirit of the invention and the spirit and scope of the appended claims.

Having described my invention, what I claim is:—

1. A miniature fence comprising posts having sockets formed therein, brackets secured to the lower end of said posts for supporting the same in vertical position, and fence sections connecting said posts and comprising rails, heads formed on said rails and fitting within said sockets, and pales connecting said rails between their ends.

2. In combination, a fence post, a gate, a bracket secured to the lower end of said post, a stub shaft secured to said gate and working within said bracket, a socket formed in the post, a plug fitting within said socket, and a split ring having portions thereof embedded in said plug and embracing said gate.

ELLSWORTH W. MILLER.